United States Patent Office.

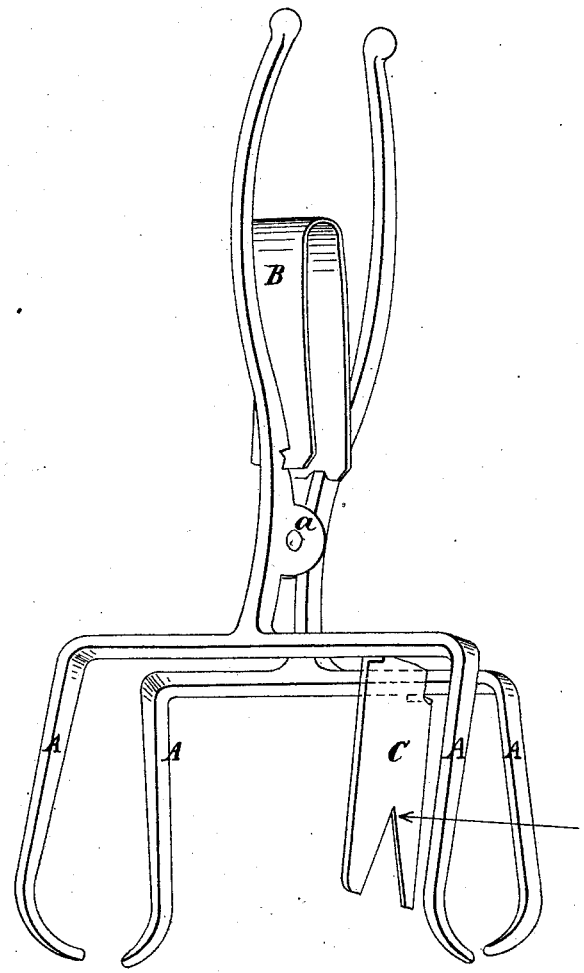

JOHN WESTCOTT, OF PATCHOGUE, NEW YORK.

Letters Patent No. 69,878, dated October 15, 1867.

IMPROVEMENT IN ANIMAL TRAPS.

*The Schedule referred to in these Letters Patent and making part of the same.*

TO ALL WHOM IT MAY CONCERN:

Be it known that I, JOHN WESTCOTT, of Patchogue, in the county of Suffolk, and State of New York, have invented a new and useful Improvement in Mole-Traps; and I do hereby declare that the following is a full, clear, and exact description thereof, which will enable others skilled in the art to make and use the same, reference being had to the accompanying drawings, forming part of this specification.

This invention relates to an improved mole-trap, and consists in a pair of forks pressed together by a spring. These are kept apart by a metal dog, and the trap set lengthwise in the channel made by the mole in the ground. The mole running along his burrow knocks against the dog, which he thereby dislodges, and the spring shuts the trap upon him.

The accompanying drawing represents the trap as set in the ground.

A A are the iron forks, bolted together at $a$, and acted upon by the strong steel spring B. C is the dog, which keeps open the prongs of the forks. The arrow head represents the direction taken by the mole in his furrow. As he reaches the dog he dislodges it by striking against it, a very slight blow in the direction of the furrow being sufficient for the purpose, and the spring B closes the forks A upon the mole with considerable force.

Having thus described my invention, what I claim as new, and desire to secure by Letters Patent, is—

The mole-trap, constructed as described, consisting of the iron forks A A, formed at right angles upon the cross-bars of the handles, the latter being pivoted together at $a$, and clamping between them the spring B, said forks held open by means of the notched dog C between the cross-bars, as herein set forth for the purpose specified.

The above specification of my invention signed by me this 20th day of March, 1867.

JOHN WESTCOTT.

Witnesses:
WM. F. McNAMARA,
ALEX F. ROBERTS.